Feb. 7, 1939. C. C. KRAJIČEK 2,145,985
ROOFING CUTTER
Filed Oct. 27, 1936
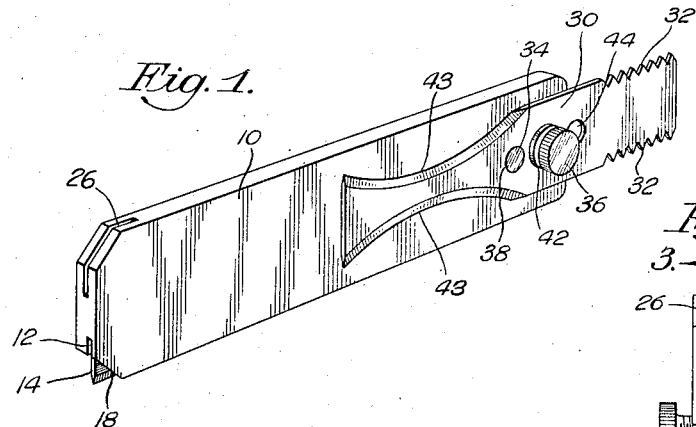
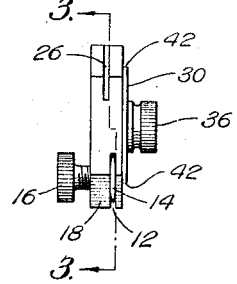
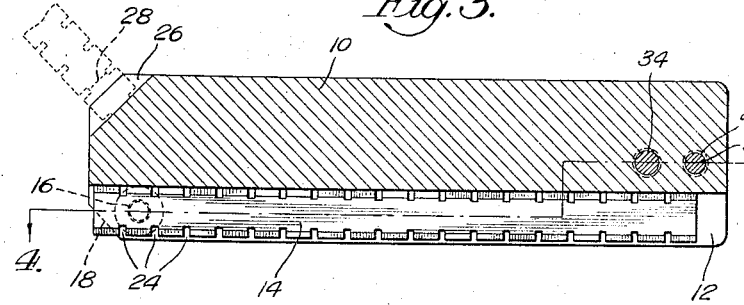
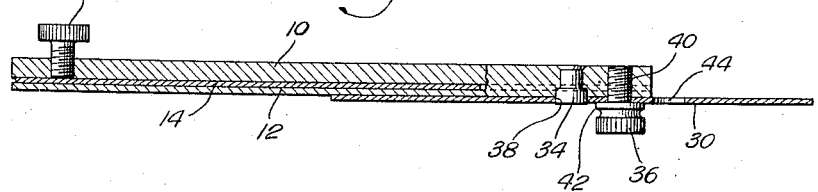
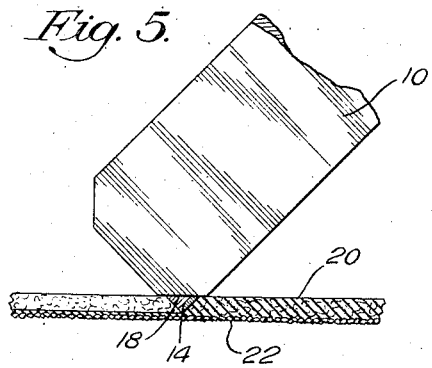
Charles C. Krajiček,
INVENTOR
BY Victor J. Evans & Co.
HIS ATTORNEYS Patented Feb. 7, 1939

2,145,985

UNITED STATES PATENT OFFICE 2,145,985

ROOFING CUTTER

Charles C. Krajiček, Cicero, Ill.

Application October 27, 1936, Serial No. 107,913

4 Claims. (Cl. 30—294)

My invention relates to the art of cutting, marking, and trimming roofing and siding material, and has among its objects and advantages the provision of an improved cutting and marking tool.

In the accompanying drawing:

Fig. 1 is a perspective view of my invention;

Fig. 2 is an end view;

Fig. 3 is a sectional view along the line 3—3 of Fig. 2;

Fig. 4 is a sectional view along the line 4—4 of Fig. 3; and

Fig. 5 is a view illustrating the manner in which a sheet of roofing material may be cut.

In the embodiment selected to illustrate my invention I make use of a body 10 of such size and shape as to be readily grasped in the hand. The body is generally rectangular in configuration and comprises metal. Metal gives the body an advantageous weight which facilitates effective manipulation of the tool. One edge of the body 10 is provided with a slot 12 extending the full length of the body for the reception of a thin cutting blade 14 which is secured within the slot by means of a set screw 16.

In applying composition, shingles, siding and roofing material to buildings it is necessary to cut some of the material. One face of the material is usually covered with a mineral substance which is difficult, if not impossible, to cut and which dulls cutting edges. My tool embodies a cutting blade and means cooperating therewith for limiting the depth of the cut but permits the material to be cut substantially through to the coated surface so as to permit separation of the roofing material. To this end the body 10 includes an angular guide surface 18 upon which one corner of the blade 14 projects. In cutting, the roofing material is severed inwardly of its one coated surface, as indicated in Fig. 5. In this view the body 10 is held at such an angle as to position the angular surface 18 adjacent the roofing material 20. The blade 14 is adjusted so as to project sufficiently far beyond the guide surface 18 to make a cut terminating slightly in the clear of the mineral surfacing 22. With the roofing material cut to the depth illustrated, the uncut surfacing may be broken in a straight line corresponding to the line of cut.

When one cutting corner of the blade becomes dull, the blade may be reversed. Either end of the blade may be associated with the angular surface 18, and when all cutting corners of the blade become dull, the dull end may be broken off to present a sharp cutting edge. To facilitate breaking of the blade I provide both cutting edges with inwardly extending slots 24 which are aligned so that the blade is weakened transversely of its longitudinal axis and will break in a straight line. To aid in breaking the blade one corner of the body 10 is slotted at 26 for the reception of the blade. After the blade has been positioned as illustrated by dotted lines in Fig. 3 lateral pressure on the blade will cause it to break along the line 28. The slots 24 are spaced relatively close, but the spacing is such as to permit sufficient projection of the blade to cut all types of conventional roofing material. In Fig. 3, I illustrate the projecting end of the blade as being adjusted to cut its maximum depth, at which time the nearest slot 24 lies within the angular face 18. Various degrees of projection are easily attained by merely loosening the set screw 16.

In the laying of roofing material it is frequently necessary to place a sheet in position and mark the sheet to conform to the shape and area of the surface to be covered. After markings are made, lines are drawn through the markings and the roofing material severed along such lines. To facilitate marking I provide the body 10 with a blade 30 provided with two toothed surfaces 32. The saw nature of the reaches 32 cut easily into the roofing material for marking purposes. I mount the blade 30 on one side of the body 10 through the medium of a pin 34 and a set screw 36. The pin 34 is fixedly connected with the body 10 and projects through an opening 38 in the blade 30. In Fig. 4, I illustrate the set screw 36 as having threaded relation at 40 with the body 10, which screw includes a flange 42 for pressing the blade 30 against the body. Because of the pin 34 and the set screw 36, the blade 30 is prevented from rotating about the screw 36 as an axis.

In many cases the application of building paper to a wall structure necessitates placement of the paper and cutting thereof to fit the paper to an area to be covered. I provide the blade 30 with cutting edges 43 of concave configuration. These edges may be adjusted for cutting purposes by loosening the screw 36 and turning the blade 30 end for end to position the pin 34 within the opening 44.

For packaging purposes, the blade 30 may be disconnected from the body 10, while the blade 14 may be shifted inwardly of the body for bringing the projecting cutting corner thereof within the contour of the body.

Without further elaboration, the foregoing will so fully explain my invention that others may, by applying current knowledge, readily adapt the same for use under various conditions of service.

I claim:

1. A roofing tool comprising a grooved handle, a cutting blade adjustably secured within said groove, said blade having a notched cutting edge, one end of said handle including guide means for limiting the cutting depth of the blade, said notches lying inwardly of said guide means, and means for securing the blade in position.

2. A roofing tool comprising a grooved handle, a blade including two cutting edges provided with aligned notches for weakening the blade transversely, one corner of said blade extending beyond the handle, said handle being provided with means for limiting the cutting depth of the projecting corner of the blade, said notches lying within said means, and means for securing the blade in position.

3. A device of the type described comprising a handle provided with a groove, a blade including two cutting edges provided with aligned notches for weakening the blade, means for securing the blade in said groove, said handle being provided with a second groove, one end of said blade being insertable within said second groove, said blade being adapted to be broken along a predetermined line characterized by two aligned notches when bent laterally with one end positioned in said second groove.

4. A roofing cutter comprising a handle having a longitudinal groove extending inwardly of one edge and intersecting one end, the said one end having a beveled surface intersecting said groove, a knife blade having a perforated edge, said knife blade lying within said groove with one corner of the blade projecting beyond said beveled edge, to expose a cutting reach of said sharpened edge, the remaining reach of the cutting edge lying wholly within said groove, the opposite edge of said blade having abutting relation with the bottom of the groove, and means for securing the blade in the groove.

CHARLES C. KRAJIČEK.